Oct. 7, 1969  E. KANSKY  3,471,392
HERMETICALLY SEALED ELECTRODE
Filed Dec. 1, 1965

INVENTOR:
EVGEN KANSKY
BY
Kurt Kelman
AGENT

United States Patent Office 3,471,392
Patented Oct. 7, 1969

3,471,392
HERMETICALLY SEALED ELECTRODE
Evgen Kansky, Ilirska ul. 29, Ljubljana, Yugoslavia
Filed Dec. 1, 1965, Ser. No. 510,740
Claims priority, application Yugoslavia, Dec. 19, 1964,
1,828/64
Int. Cl. B01k 3/00; B01d 13/00
U.S. Cl. 204—195                    4 Claims

ABSTRACT OF THE DISCLOSURE

An electrode for EMF measurements has a glass casing partly formed by a membrane of glass conductive because of the presence of alkali metal ions. A body of alkali metal in the casing cavity may be spaced from the membrane and from a metallic conductor passing through the casing which is sufficiently tight to maintain a high vacuum therein.

---

Figure 1:
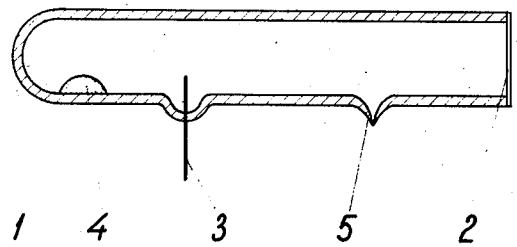

The invention deals with the electrode for electrochemical measurements of potentials or electromotive forces EMF in galvanic cells and application thereof as a part of electrochemical instrument for measurements of various physico-chemical magnitudes or for the control of physico-chemical processes.

The electrode for electrochemical measurements according to the invention consists of a vacuum-tight casing closed on one or more sides by a membrane made of solid electrolyte able to conduct electrical charges by alkali ions. In the casing a vacuum-tight metal conductor is fixed. In any optional place inside the casing there is a certain amount of alkali metal not necessarily in direct contact with the membrane or the metal conductor.

The inside of the electrode according to the invention is evacuated to high vacuum or filled with a rare or some other inert gas or gas mixture.

The alkali metal in the electrode according to the invention is one of the metals of the Ia group of the periodic system of elements, but it can be an alloy of two or more of these metals as well, or an alloy of alkali metals and other metals with a sufficiently high alkali metal vapour pressure in the operating temperature range.

The membrane of the electrode according to the invention is a solid electrolyte devoid of electron conductivity and containing one or more alkali metal components. In the temperature range of measurement the membrane must have a sufficiently high ion conductivity due to the mobility of alkali metal ions. The electron conductivity of the membrane has to be negligible. Electrolytes suitable as membrane materials include ceramics containing alkali metal compounds, glass, alkali metal salts, alkali metal oxides, mixtures of alkali metal salts and mixtures of akali metal oxides, as well as mixtures of alkali metal salts with alkali metal oxides.

The alkali metal of the electrode according to the invention has the same or a higher atomic number as the alkali metal component of the membrane.

The membrane of the electrode according to the invention can have any geometric form. It can be plane, spherically concave, spherically convex, cylindrical with an active inside or outside surface. The surface of the membrane in comparison with the casing can have a various size, from parts of mm.$^2$ to several cm.$^2$, according to the requests of the casing. The membrane is fixed to the casing by methods applied in high-vacuum technique, e.g. by direct sealing, by soldering, cold sealing, all with or without intermediate metal, glass or ceramic pieces. In the case the casing of the electrode according to the invention is made of metal or some other electronic conductor, the casing itself has the function of the metal conductor.

The electrode according to the invention can be provided with a second metal conductor contacting the outside of the membrane on its edge only or covering a part of the membrane. This second metal conductor can be fixed to the membrane by pressing, sealing, coating, vacuum metallization etc.

The outside of the membrane of the electrode according to the invention can be partially or completely covered by a layer of elements, alloys, organic or inorganic compounds or their mixtures. In this case the above mentioned second metal conductor can be placed under the layer or over it.

It is known that in suitable galvanic cells various chemical reactions can be executed. In as far as the reaction components are not metals or electronic conductors they have to be in direct contact with the metal conductors. Further on, both components have to be separated by an electrolyte, i.e. an ionic conductor through which the material and electrical charges are transported. The metal conductors as well as the electrolyte have to be chemically inert in regard to the reaction components. In such a cell an electromotive force EMF appears between the reaction components. The chemical reaction is strictly controlled: it proceeds only when the metal conductors are connected with an outside electrical circuit.

For the unit composed of the metal conductor, the electrolyte and one reaction partner which is in direct contact with the metal conductor and the electrolyte, the term electrode is used in electrochemistry. There are known the standard $H_2$-electrode, the standard $Cl_2$-electrode, the standard Ag-electrode, the calomel electrode, the glass electrode etc. With these electrodes various aqueous solutions are used as electrolytes.

With alkali metal electrodes the use of aqueous electrolytes is impossible because of the reaction between water and the alkali metal.

The existence of such electrodes for scientific purposes is known. Various melts of alkali salts or alkali glasses have been used as non-aqueous electrolytes. In the case of electrodes with alkali-glass electrolyte (K. Hauffe, Z. Elektrochem. 1940, 46, p. 348; O. Kubaschewski, E. Evans, Metallurgical Thermochemistry, Pergamon Press, London 1956, p. 133), the bulk alkali metal was in direct contact with the glass electrolyte and the metal conductor. The alkali metal was protected from oxidation by an inert gas flow. Several imperfections of the construction of this alkali metal electrode prevented technical use thereof. The main imperfections are as follows:

Certain kinds of glass require very thin membranes in order to secure a sufficient electrical conductivity in the temperature range from 100–300° C. These thin glass membranes, when cooling down after the measurements, usually cracked because of the stresses caused by the crystallization of the alkali metal directly touching the membrane. Electrodes with cracked membranes are of no use.

During the measurements the alkali metal is usually in the liquid state. Therefore a stronger inclination of the electrode can cause loosing of the contact between the alkali metal, the membrane and the metal conductor.

Rinsing with inert gas and purification of the gas cause complications.

The proposed invention with the completely new conception of the alkali metal electrode removed the above mentioned imperfections and enabled creation of a technically widely applicable alkali metal electrode.

The main characteristics of the electrode according to the invention are as follows:

The alkali metal is not necessarily in direct contact with the membrane, i.e. with the electrolyte.

The alkali metal is not necessarily in direct contact with the metal conductor.

The electrode can be used in any position.

The electrode is hermetically closed, and thus no rinsing with inert gas is needed.

The inventive ideas of the proposed invention are based on the two following new scientific findings:

A thin invisible film of alkali atoms, which is in thermodynamic contact with the bulk alkali metal through the vapour phase and is adsorbed on glass, ceramics or other membrane material, has a high enough electric conductibility already at room temperature.

The thin film of adsorbed alkali atoms is reversibly changing with temperature changes. At constant temperature an equilibrium between this film and the bulk alkali metal is established.

Figure 2:
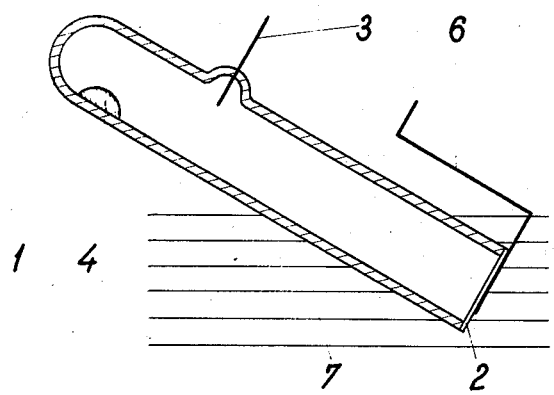
Figure 3:
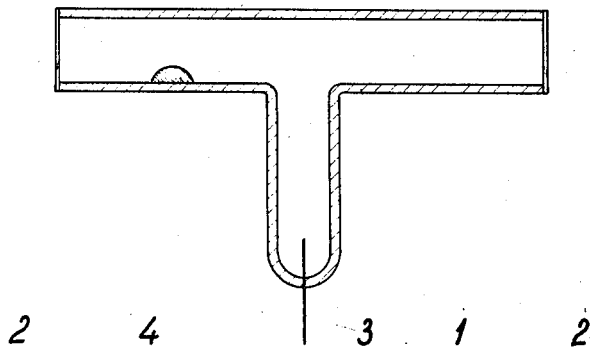

The accompanying design illustrates the object of the invention in detail. FIG. 1 represents schematically the longitudinal section of the alkali metal electrode according to the invention. FIG. 2 shows the longitudinal section of the electrode according to the invention, equipped with the second metal conductor, which is in contact with the investigated material. FIG. 3 represents the longitudinal section of the alkali metal electrode according to the invention, with two membranes.

FIG. 1 shows the scheme of the electrode according to the invention, in the longitudinal section thereof. The electrode is a closed housing evacuated or inert-gas filled. The casing 1 is made of ceramics or glass, but it can also be made of metal or some other vacuum material. To the casing 1 the membrane 2 made of ceramics, glass or some other solid electrolyte which conducts electricity by alkali ions is vacuum-tightly fixed. The membrane 2 can be amorphous or crystallized. A glass membrane is more suitable for measurements at low temperature because of its greater conductivity and simpler technology. At higher temperatures a ceramic membrane is advantageous because, at higher temperatures, glass reacts with alkali metals and becomes soft.

The form of the membrane has to correspond to the requirements of the investigated material, especially the state of aggregation and form thereof. In the case of the membrane being a cylinder and the alkali metal being on the outside, the electrode is suited for flow measurements.

The metal conductor 3 is vacuum-tight built in the casing 1 and is usually made of metal used for glass-to-metal seals. In the case the casing 1 is made of metal, this metal conductor 3 is not needed, as the function thereof is taken over by the casing 1 itself. In the electrode according to the invention a certain quantity of alkali metal 4 is placed. It is not necessary that the alkali metal 4 is in direct contact with the membrane 2 or with the metal conductor 3.

As a rule, the alkali metals having a lower atomic number can substitute alkali metals with higher atomic number in the compounds thereof. In order to prevent undesired reactions between the alkali metal 4 and the membrane material on the inside of the membrane 2, which could be followed by undefined changes in potential, a membrane material with an alkali component having the same or lower atomic number as the alkali metal should be chosen. In the case of the membrane containing more alkali components, the alkali metal 4 should have the same or higher atomic number as the membrane alkali component with the highest atomic number.

The pumping tube 5 known in bulbs and electronic tubes serves only during the electrode fabrication for evacuation, for introducing the alkali metal and, eventually, for gas filling.

FIG. 2 shows the electrode according to the invention in longitudinal section, equipped with the second metal conductor 6 which is in close contact with the outside surface of the membrane 2 and the material 7 which is to be investigated, in principle.

FIG. 3 shows the longitudinal section of the electrode according to the invention with two membranes 2. In the case of two or more membranes, the membrane 2 can be of different form. The metal conductor 3 is common for all membranes. The metal conductors 6, the function of which is clear from the above description and therefore not noted in FIG. 3, have to be in contact with the outside surfaces of the membranes, separated and mutually well isolated.

The principle of the functioning of the electrode according to the invention is as follows:

Evaporation of the alkali metal causes that a thin invisible film of alkali atoms is adsorbed on the membrane and all the other inside surface of the electrode. Through the vapour phase this film is in equilibrium with the bulk alkali metal and has, at room and higher temperatures, a sufficient electrical conductivity to secure a good contact between the metal conductor and the membrane.

Any chemical reaction changing the concentration of alkali ions or atoms on the outside surface of the membrane, in the highly thin upper layer thereof, causes a change of the potential of the alkali atoms adsorbed on the inside surface of the membrane. This change of the potential can be measured as a change of EMF by contacting the outside surface of the membrane by a second metal conductor. In this way a galvanic cell is obtained. The EMF measured between the two metal conductors depends on the substance which is in contact with the membrane. Every change of the composition of this substance is noticed as a change of the EMF. Thus the electrode according to the invention, equipped with a second metal conductor, enables control of different physicochemical processes. An advantage of the new electrode is the fact that the investigated substance can be solid, liquid or gaseous. A further advantage of the electrode according to the invention is that it can be applied in a very wide temperature range.

In the case the invented electrode has two or more membranes, a different reaction on each of the membranes can proceed. So, e.g., while one membrane is in contact with the substance investigated, the second membrane can remain in contact with the gaseous phase only, or the two membranes may be covered by layers of the investigated substance of different thickness, this represents the simplest application of the electrode with two membranes.

In certain conditions the electrode according to the invention indicates the partial pressure of different oxidative or reductive gases being in contact with the membrane. In some cases there suffices the second metal conductor made of a suitable metal and partially covering the membrane in the form of a metallized comb. In other cases it is advisable to cover the membrane with a thin layer of a substance which simultaneously reacts with the gas studied and with the membrane by exchanging ions. The second metal conductor can be placed either on the above mentioned layer or under it. In this way an electrode of higher order, selective for a certain gas, is obtained. The relation between the EMF and the partial pressure is logarithmic. In the case of oxygen and other oxidative gases as surface layer deposited on the membrane, different oxides with a wide non-stechiometric range, or metals producing such oxides are of use.

The electrode according to the invention is manufactured following the methods of the high-vacuum technique. Introducing of alkali metal is the most important step. This introducing has to be performed in a protecting atmosphere or vacuum, as the alkali metals react with air. The pumping tube is connected with a high-vacuum pumping unit, then the electrode is evacuated. The alkali metal is distilled from a side tube through the pumping tube into the electrode.

Another possibility to introduce the alkali metal is introduction into the electrode of the alkali metal Me source, which is composed of known mixtures of Me₂CrO₄+Si (Zr, Ti) or MeCl+Ca closed in a metal housing. Heating this mixture at high frequency to 600–900° C., alkali metal is freed. This source does not influence the function of the electrode, so it can stay inside it.

In the case the casing of the electrode is made of glass, the electrode can be filled with alkali metal by electrolysis through the glass.

The electrode according to the invention connected into a corresponding electrochemical circuit has the following applications:

(1) The electrode equipped with the second metal conductor serves as alkali metal partial pressure gauge in an atmosphere containing alkali metal vapour. The advantages of this gauge are:

the logarithmic relation between the pressure and electromotive force
the range of the gauge is very wide, i.e. from 100 to $10^{-16}$ mm. of Hg
the gauge function is isothermic (2) The electrode serves as indicator electrode for the potentiometric control of reactions in two- or polycomponent systems comprising one or more alkali components. To this purpose the membrane of the electrode can be directly coated with a thin film of the reaction components, or the membrane has to be pressed to the investigated substance. In the case the reaction proceeds quasi reversibly, the EMF gives the basic thermodynamic quantity, i.e. the free enthalpy of the reaction. The following systems are given as examples: Sb-Me, Te-Me, Sn-Me, Au-Me, where Me is an alkali metal.

(3) The electrode serves as indicator electrode for the potentiometric control in two- or polycomponent systems which do not comprise alkali metal, but one component of the system is able to react with the alkali metal (e.g. in systems Sn-Cu, Ag-Sb, Fe-S). The electrical potential of the electrode here is given by the affinity between the alkali ions coming from the membrane and the investigated compound or system.

(4) The electrode serves as an indicator electrode for the potentiometric control of reactions in systems, where a component is an oxidative or reductive gas. This is a particular form of the application described under item 3 and in which the electrode becomes a pressure gauge.

(5) The electrode according to the invention, equipped with a corresponding metal conductor, serves as an indicator redox electrode with no liquid electrolyte, in aqeous solutions. Provided with a membrane of glass with pH-metric function, the electrode serves as a hydrogen electrode applicable in a very wide temperature range, which extends from temperatures below 0° C. to temperature above 100° C.

(6) The electrode according to the invention enables control of the synthesis of photo-cathodes in which the alkali metal is the essential component. A miniaturized electrode according to the invention, mounted into an electron tube containing alkali metal, e.g. phototubes, serves as a valuable control of alkali vapour pressure changes during the fabrication and operation of the tube.

(7) The electrode according to the invention with two membranes gives the possibility to investigate simultaneously the substance changes and the vapour pressure in systems in which one component is a vapour or gas, e.g. alkali metal vapour, while the other component is a solid. Measurements of this kind give detailed information on the thermodynamics and kinetics of the reaction.

It should be understood that the above mentioned applications have only been enumerated as an illustration, and that the usages of the electrode according to the invention are very broad, indeed, in the field of measurements and control of physico-chemical processes.

What I claim is:

1. An electrode for determining electromotive force comprising, in combination:
    (a) a casing enclosing a cavity and hermetically sealing a vacuum or an inert gas therein
        (1) said casing having a wall portion constituted by a solid electrolyte having ion conductivity due to alkali metal ions, but substantially devoid of electron conductivity, said wall portion having a face in said cavity and a face outside said cavity,
    (b) a metallic conductor having respective portions in said cavity and outside the same; and
    (c) a body of at least one alkali metal in said cavity.

2. An electrode as set forth in claim 1, wherein said metallic conductor and a conductor on the said outside face of said wall portion constitute a pair of electrode elements, and said body of alkali metal is spaced from one of said elements.

3. An electrode as set forth in claim 2, wherein the lowest atomic number of alkali metal in said body of alkali metal is at least equal to the atomic number of the alkali metal of said electrolyte.

4. An electrode as set forth in claim 1, wherein said metallic conductor constitutes a wall of said cavity.

References Cited

UNITED STATES PATENTS

| | | | |
|---|---|---|---|
| Re. 24,222 | 9/1956 | Patnode et al. | 204—195 |
| 2,728,656 | 12/1955 | Neher | 204—195 |
| 3,324,013 | 6/1967 | Dewing | 204—1.1 |

FOREIGN PATENTS 492,936  9/1938  Great Britain.

OTHER REFERENCES

Kubaschewski et al. "Metallurgical Thermochemistry," 2d ed., 1956, pp. 133 and 134.

JOHN H. MACK, Primary Examiner
T. H. TUNG, Assistant Examiner

U.S Cl. X.R.
136—153